United States Patent

Pigerol et al.

[11] 4,209,440
[45] Jun. 24, 1980

[54] ASSOCIATIONS FOR STABILIZING VINYL RESINS

[75] Inventors: Charles Pigerol, Saint-Ouen; Marie-Madeleine Chandavoine; Paul de Cointet de Fillain, both of Sisteron, all of France

[73] Assignee: Labaz, Paris, France

[21] Appl. No.: 951,853

[22] Filed: Oct. 16, 1978

[30] Foreign Application Priority Data

Oct. 28, 1977 [FR] France ................................ 77 32662

[51] Int. Cl.$^2$ ............................................... C08K 5/34
[52] U.S. Cl. ............................. 260/45.8 N; 252/401; 252/403; 252/405; 260/23 XA; 260/45.7 PH
[58] Field of Search ................. 260/45.8 N; 546/321; 252/401, 403, 405

[56] References Cited

U.S. PATENT DOCUMENTS

| 3,888,818 | 6/1975 | Deblandre et al. | 260/45.8 N |
| 4,096,112 | 6/1978 | Pigerol et al. | 260/45.8 N |
| 4,113,736 | 9/1978 | Pigerol et al. | 260/45.8 N |
| 4,129,572 | 12/1978 | Pigerol et al. | 260/45.8 N |

FOREIGN PATENT DOCUMENTS 2239496  2/1975  France .

OTHER PUBLICATIONS

Chevassus et al., The Stabilization of Polyvinyl Chloride, 1963, pp. 166–169.

Primary Examiner—Howard E. Schain
Assistant Examiner—R. A. White
Attorney, Agent, or Firm—Mason, Kolehmainen, Rathburn & Wyss

[57] ABSTRACT

This invention relates to new associations of a compound of the formula:

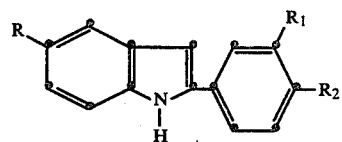

wherein $R_1$ and $R_2$ represent a hydrogen atom, an alkyl, alkoxy or hydroxy radical and R represents a hydrogen atom or an alkyl or alkoxy radical, and of a compound of the formula:

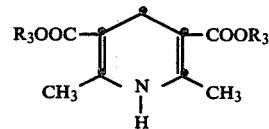

wherein $R_3$ represents an alkyl, alkenyl, alkynyl or aralkyl radical or a radical of the formula $R_4-O(CH_2)_n-$, wherein $R_4$ represents an alkyl or phenyl radical and n is 2, 3 or 4.

The associations according to the invention are stabilizers for vinyl resins.

12 Claims, No Drawings

ASSOCIATIONS FOR STABILIZING VINYL RESINS

The invention relates to associations of products useful as stabilizers for vinyl resins.

The associations according to the invention are mixtures of an indole derivative of the general formula:

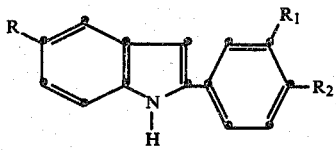

wherein $R_1$ and $R_2$, which are the same or different, each represent a hydrogen atom, a branched- or straight-chain alkyl or alkoxy radical containing from 1 to 12 carbon atoms or a hydroxy radical, R represents a hydrogen atom or a branched- or straight-chain alkyl or alkoxy radical containing from 1 to 4 carbon atoms, and of a dihydropyridine of the general formula:

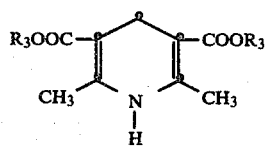

wherein $R_3$ represents a branched- or straight-chain alkyl radical containing from 1 to 22 carbon atoms, a branched- or straight-chain alkenyl or alkynyl radical containing from 3 to 11 carbon atoms, an aralkyl radical optionally substituted on the para- or ortho-position by a halogen atom or by a methyl or methoxy radical, a radical $R_4-O(CH_2)_n-$ wherein n is 2, 3 or 4 and $R_4$ represents a branched- or straight-chain alkyl radical containing from 1 to 4 carbon atoms or a phenyl radical.

The compounds of formula I are known, having been described in British Pat. Nos. 1,487,659 and 1,489,685, and have been prepared by the processes described in said patents.

The compounds of formula II have been described in French patent applications Nos. 77 30991 and 77 30992 and have been prepared by the processes described in said patent applications.

Vinyl resins are known to deteriorate under the influence of heat and it is necessary to add a stabilizing agent to these masses of synthetic materials in order to retard thermodegradation and thus delay coloration of the resin.

Vinyl resins are also known to deteriorate under the influence of sunlight and a change in the original coloration may result therefrom.

This problem is particularly important where containers for food and drink are concerned. It is readily appreciated that food and drink could not be packed in containers of which the coloration may change in course of time.

The problem is the same with regard to floor-coverings, of which the coloration must also remain stable for a long period of time.

It is for these reasons that stabilizers which are both thermostabilizers and photostabilizers are specially recommanded for vinyl resins.

According to the British patents and the French patent applications cited hereabove, compounds of formulae I and II have stabilizing properties and are more specially intended for the thermostabilization of resins used for manufacturing containers for food and drink.

Surprisingly, it has been found that by associating a compound of formula I with a compound of formula II, a potentiation of the stabilizing power of each molecule is obtained.

This discovery is very important since it may be reasonably expected that the same stabilizing power may be obtained by using smaller quantities of each product when associated than when used alone.

This possibility of using smaller quantities of stabilizing agents is a definite asset as far as plastic containers for food and drink are concerned.

Besides the lower cost-price obtained, it should be emphasized that when the concentration in stabilizer is lower, the amount of stabilizer extracted by the food or drink will also be lower.

This fact becomes particularly important when the restrictive trends of the various national legislation with regard to food and drink are considered.

It may be stated, as an example, that the associations of the invention already exert a good stabilizing power when they are introduced in a vinyl resin in the proportion of 0.01 to 0.3 part per hundred parts of resin (p.h.p.r.), the proportion of each constituent being generally lower than 0.2 p.h.p.r. and may at times lie between 0.01 and 0.1 p.h.p.r.

In the associations according to the invention, the ratio by weight between the compounds of formula I and those of formula II will generally be between 0.05 and 1 and preferably between 0.1 and 1. This ratio may however be equal to 1 or be between 1 and 20.

It has also been found that the associations of the invention possess a photostabilizing power which is far from negligible resulting in better resistance of the resin to sunlight, i.e. in a reduction, or at certain concentration the inhibition of the tendency to darken.

This is an important advantage over the compounds of formula I, which do not prevent the vinyl resin from deteriorating under the influence of light, especially when the resin is left to stand in bright sunlight.

It is known from the above-mentioned patents and patent applications that the compounds of formulae I and II have low acute toxicity, the $LD_{50}$ (the dose of substance which provokes the death of 50% of the treated animals) being over 2 g/kg by oral route in mice. It may, therefore, be concluded that the associations of the invention will not create any problem of toxicity and that their use for stabilizing containers for food and drink may be envisaged.

In addition, the associations of the invention present the following advantages:

They are very valuable anti-oxidant agents

The constituents of the associations do not sublimate or they present a fairly low degree of sublimation, an advantage which is important with regard the manipulation of the compounds in industry. The associations of the invention do not therefore present any problem with regard to the health and security of those called upon to handle them.

For greater ease in expressing the results of tests, the following references have been attributed to the constituents of the associations according to the invention.

| Compounds of formula I | Code |
|---|---|
| 2-Phenyl-indole | S 3621 |
| 2-(4'-Dodecyl-phenyl)-indole | S 3628 |
| 2-(3'-Methoxy-4'-hydroxy-phenyl)-indole | S 3630 |
| 2-(3'-Methyl-4'-methoxy-phenyl)-indole | LCS 26084 |
| 2-Phenyl-5-methoxy-indole | LCS 26003 |
| 2-(3'-Dodecyl-4'-methoxy-phenyl)-indole | LCS 26162 |
| 2-(3',4'-Diethoxy-phenyl)-indole | LCS 26177 |
| 2-(3'-Methoxy-4'-propoxy-phenyl)-indole | LCS 26178 |
| 2-(3'-Methyl-4'-ethoxy-phenyl)-indole | LCS 26185 |
| 2-(3'-Methoxy-4'-ethoxy-phenyl)-indole | LCS 26144 |
| 2-(4'-Methyl-phenyl)-indole | LCS 26009 |
| 2-(4'-Methyl-phenyl)-5-methyl-indole | LCS 26035 |

| Compounds of formula II | Code |
|---|---|
| 2,6-Dimethyl-3,5-dicarboallyloxy-1,4-dihydropyridine | LCS 28511 |
| 2,6-Dimethyl-3,5-dicarboethoxy-1,4-dihydropyridine | LCS 28501 |
| 2,6-Dimethyl-3,5-dicarbomethoxy-1,4-dihydropyridine | LCS 28504 |
| 2,6-Dimethyl-3,5-dicarbododecyloxy-1,4-dihydropyridine | LCS 28507 |
| 2,6-Dimethyl-3,5-dicarbobenzyloxy-1,4-dihydropyridine | LCS 28512 |
| 2,6-Dimethyl-3,5-dicarbopropargyloxy-1,4-dihydropyridine | LCS 28513 |
| 2,6-Dimethyl-3,5-di-(4'-carbomethoxy-phenoxy)-1,4-dihydropyridine | LCS 28541 |
| 2,6-Dimethyl-3,5-di-(2'-carbophenoxy-ethoxy)-1,4-dihydropyridine | LCS 28588 |
| 2,6-Dimethyl-3,5-dicarbobehenyloxy-1,4-dihydropyridine | LCS 28601 |
| 2,6-Dimethyl-3,5-dicarbopalmityloxy-1,4-dihydropyridine | LCS 28603 |

A compound of formula II wherein $R_3$ corresponds to the alkyl radical of DOBANOL 23 (a mixture of primary alcohols containing from 12 to 15 carbon atoms which is marketed by SHELL CHIMIE) has also been tested. This compound is designated by the code No. LCS 28597.

A. Compatibility of the compounds of formulae I and II

Before studying the potentiation of the stabilizing power of each constituent of the association of the invention, the compatibility of said constituents within a vinyl resin was checked.

It was found that by incorporating a quantity of a compound of formula II in a vinyl resin which already contained a compound of formula I, the thermostabilization of the resin was markedly increased.

The study of the thermostability of the following resin was carried out according to the GARDNER method described in British Pat. No. 1,489,685:

| Ingredients | Parts by weight |
|---|---|
| Polyvinyl chloride resin | 100 |
| Antishock agent | 11 |
| Acrylic resin | 0.5 |
| Epoxide soja bean oil | 3.0 |
| Zinc stearate | 0.125 |
| Calcium stearate | 0.3 |
| Stabilizer of formula I | 0.1 |
| Stabilizer of formula II | 0 or 0.2 |

The sheets were placed in a ventilated oven at 185° C. and were removed at fixed intervals of time. Their coloration were expressed in terms of the reference figures of the GARDNER scale.

The following results were obtained:

| Stabilizer of formula I | Stabilizer of formula II | \multicolumn{9}{c}{Time in minutes} |
|---|---|---|---|---|---|---|---|---|---|---|
| | | 0 | 10 | 20 | 30 | 40 | 50 | 55 | 60 | 75 |
| S 3630 | — | 1 | >1 | <2 | <3 | <4 | 4 | >4 | >4 | 11 |
| S 3630 | LCS 28511 | 1 | 1 | >1 | <2 | <2 | 3 | <4 | <4 | 5 |
| LCS 26084 | LCS 28511 | 1 | 1 | 1 | >1 | >1 | <2 | 2 | >2 | 4 |
| LCS 26162 | LCS 28511 | 1 | 1 | 1 | >1 | >1 | <2 | 2 | >2 | 4 |
| LCS 26177 | LCS 28511 | 1 | 1 | 1 | >1 | >1 | <2 | 2 | >2 | >4 |
| LCS 26178 | LCS 28511 | 1 | 1 | 1 | >1 | >1 | <2 | 2 | >2 | 4 |
| LCS 26185 | LCS 28511 | 1 | 1 | 1 | >1 | >1 | <2 | 2 | >2 | 4 |
| LCS 26144 | LCS 28511 | 1 | 1 | 1 | >1 | >1 | <2 | 2 | >2 | 5 |
| S 3630 | — | 1 | >1 | <2 | <3 | <4 | 4 | >4 | >4 | 11 |
| S 3630 | LCS 28501 | 1 | 1 | >1 | >1 | <2 | 3 | >3 | <4 | 5 |
| LCS 26084 | LCS 28501 | 1 | 1 | >1 | >1 | >1 | <2 | 3 | >3 | 4 |
| LCS 26162 | LCS 28501 | 1 | 1 | 1 | >1 | >1 | <2 | 3 | >3 | 5 |
| LCS 26177 | LCS 28501 | 1 | 1 | 1 | >1 | >1 | <2 | <3 | 3 | 4 |
| LCS 26178 | LCS 28501 | 1 | 1 | 1 | >1 | <2 | >2 | <4 | 4 | 5 |
| LCS 26185 | LCS 28501 | 1 | 1 | 1 | >1 | >1 | <2 | <3 | 3 | 4 |
| LCS 26144 | LCS 28501 | 1 | 1 | 1 | >1 | >1 | <2 | <3 | 3 | 5 |
| S 3630 | — | 1 | >1 | <2 | <3 | <4 | 4 | >4 | >4 | 11 |
| S 3630 | LCS 28504 | 1 | 1 | >1 | >1 | <2 | 3 | >3 | <4 | 5 |
| LCS 26084 | LCS 28504 | 1 | 1 | 1 | >1 | >1 | <2 | 3 | 3 | 4 |
| LCS 26162 | LCS 28504 | 1 | 1 | 1 | >1 | >1 | 2 | >3 | >3 | >5 |
| LCS 26177 | LCS 28504 | 1 | 1 | 1 | >1 | >1 | <2 | 3 | >3 | 4 |
| LCS 26178 | LCS 28504 | 1 | 1 | 1 | >1 | >1 | <2 | <3 | 3 | <4 |
| LCS 26185 | LCS 28504 | 1 | 1 | 1 | >1 | >1 | <2 | <3 | 3 | 5 |
| LCS 26144 | LCS 28504 | 1 | 1 | 1 | >1 | >1 | <2 | <3 | 3 | >5 |

The above results show the perfect compatibility of the compounds of formulae I and II since the addition of a compound of formula II to a resin containing already a compound of formula I increases in a constant manner the stabilizing effect of this latter compound.

The influence of a quantity of a compound of formula II (LCS 28504) on the thermostabilization of a resin containing 0.3 part by weight of a compound I (S 3630) was also studied.

The sheets were placed in an oven at 185° C. for 80 minutes and in a Metrastat oven at 210° C. for 60 minutes, and their coloration was expressed in terms of the reference figures of the GARDNER scale at fixed intervals of time.

The results hereunder were obtained with the following resin:

| Ingredients | Parts by weight |
|---|---|
| Polyvinyl chloride resin | 100 |
| Antishock Agent | 10 |
| Acrylic resin | 0.5 |
| Epoxide soja bean oil | 3.0 |
| SL 2016 | 0.1 |
| Zinc and calcium stearates | 0.2 |
| Hydrogenated rape-seed oil | 1.5 |
| Polyethylene wax | 0.3 |
| S 3630 | 0.3 |
| LCS 28504 | 0 to 0.5 |

SL 2016 is a solution of zinc 2-ethyl-hexanoate in a mixture of aromatic hydrocarbons boiling between 158° C. and 184° C.

(1) Oven at 185° C.

| p.h.p.r. of LCS 28504 by weight | Time in minutes | | | | | | | | |
|---|---|---|---|---|---|---|---|---|---|
| | 0 | 10 | 20 | 30 | 40 | 50 | 60 | 70 | 80 |
| 0 | 1 | >1 | >1 | 2 | 2 | <4 | 4 | >4 | 5 |
| 0.1 | 1 | 1 | 1 | >1 | <2 | >2 | 3 | <4 | 4 |
| 0.2 | 1 | 1 | 1 | >1 | >1 | <2 | <3 | 3 | <4 |
| 0.3 | 1 | 1 | 1 | >1 | >1 | 2 | <3 | 3 | >4 |
| 0.5 | 1 | 1 | 1 | >1 | >1 | >2 | 3 | 3 | 4 |

(2) Metrastat oven at 210° C.

| p.h.p.r. of LCS 28504 by weight | Time in minutes | | | | | |
|---|---|---|---|---|---|---|
| | 0 to 10 | 10 to 20 | 20 to 30 | 30 to 35 | 35 to 40 | 40 to 60 |
| 0 | 1 | 1 | >1 | >3 | >5 | Burnt at 41 min. |
| 0.1 | 1 | 1 | >1 | 2 | 4 | B. at 40 min. |
| 0.2 | 1 | 1 | >1 | 2 | 4 | B. at 40 min. |
| 0.3 | 1 | 1 | >1 | 2 | 4 | B. at 40 min. |
| 0.5 | 1 | 1 | >1 | >2 | 4 | B. at 40 min. |

The above results not only confirm that the addition of LCS 28504 increases the stabilizing effect of S 3630, but also that LCS 28504 presents a maximum effect even at the lowest concentrations, since the stability of the resins is practically the same for all concentrations in LCS 28504

B. Results of the Thermostability Study (a) Stabilization of Polyvinyl Chloride (1) Associations S 3630-LCS 28504 and S 3621-LCS 28504

This study and the following were carried out according to the GARDNER method. The sheets were heated at 210° C. in an oven for 21 minutes and their colorations were determined every 3 minutes.

The following compound was prepared:

| Ingredients | Parts by weight |
|---|---|
| Polyvinyl chloride resin | 100 |
| Antishock agent | 8 |
| Epoxide soja bean oil | 4 |
| Acrylic resin | 0.5 |
| Trinonylphenyl phosphite | 0.3 |
| SL 2016 | 0.25 |
| Calcium behenate | 0.4 |
| Glyceryl trimontanate | 0.4 |
| Hydrogenated rape-seed oil | 1.2 |
| Stabilizer | 0.3 |

The following results were obtained:

| Stabilizers | | | Time in minutes | | | | | | | |
|---|---|---|---|---|---|---|---|---|---|---|
| S 3630 | S 3621 | LCS 28504 | 0 | 3 | 6 | 9 | 12 | 15 | 18 | 21 |
| 0 | 0 | 0.3 | 1 | 1 | >1 | 2 | >3 | 5 | Burnt | — |
| 0.3 | 0 | 0 | 1 | >2 | >2 | 3 | 4 | >5 | >5 | Burnt |
| 0.15 | 0 | 0.15 | 1 | 1 | ≧1 | ≦2 | ≦3 | 4 | 5 | Burnt |
| 0 | 0 | 0.3 | 1 | 1 | 1 | 2 | 3 | 7 | Burnt | — |
| 0 | 0.3 | 0 | 1 | 2 | ≦3 | ≧3 | ≧3 | 4 | 8.5 | Burnt |
| 0 | 0.25 | 0.05 | 1 | 1 | 2 | 3 | 3 | 4 | 8 | Burnt |
| 0 | 0.20 | 0.10 | 1 | 1 | 2 | ≧2 | 3 | ≧4 | Burnt | — |
| 0 | 0.15 | 0.15 | 1 | 1 | ≦2 | ≧2 | 3 | 4 | Burnt | — |
| 0 | 0.10 | 0.20 | 1 | 1 | ≦2 | ≧2 | 4 | ≧4 | ≧5 | Burnt |

The above results show the marked superiority of the associations of the invention over each constituent of said associations used alone at equivalent concentrations.

(2) Associations

S 3630-LCS 28507 and S 3630-LCS 28511

The following compound was prepared:

| Ingredients | Parts by weight |
|---|---|
| Polyvinyl chloride resin | 100 |
| Antishock agent | 5 |
| Epoxide soja bean oil | 8 |
| Trinonylphenyl phosphite | 1 |
| Calcium behenate | 0.3 |
| SL 2016 | 0.15 |
| Hydrogenated rape-seed oil | 1.2 |
| Glyceryl trimontanate | 0.4 |
| Polyethylene wax | 0.15 |
| Stabilizer | 0.2 Or 0.1 |

The sheets were heated at 210° C. in an oven after having been processed on cylinders at 200° C.

The following results were obtained:

| Stabilizers | | | Time in min. | | | | | |
|---|---|---|---|---|---|---|---|---|
| S 3630 | LCS 28507 | LCS 28511 | 0 | 3 | 6 | 9 | 12 | 15 | 18 |
| 0.2 | 0 | 0 | 1 | 1 | 1 | 1.5 | 3 | 4.5 | 6 |
| 0.1 | 0.1 | 0 | 1 | 1 | 1 | 1.5 | 3 | 4 | 5 |
| 0 | 0.2 | 0 | <3 | <3 | <3 | 3 | 4.5 | 5 | 6 |
| 0.1 | 0 | 0 | 1 | 1 | 1 | 2 | 3 | 5 | 6 |
| 0.05 | 0 | 0.05 | 1 | 1 | 1 | 1.5 | 2 | 4 | 5 |
| 0 | 0 | 0.1 | 1 | 1 | 1 | 1.5 | 2.5 | 4.5 | 6 |

The above results clearly show the potentiation of the stabilizing power of each constituent of the associations of the invention.

(3) Associations

S 3630-LCS 28504

The stabilizing power of the associations of the invention on resins of high K wert (66 to 67) was also studied:
The following compound was prepared:

| Ingredients | Parts by weight |
| --- | --- |
| Polyvinyl chloride resin (K wert = 66) | 100 |
| Antishock agent | 5 |
| Epoxide soja bean oil | 8 |
| Trinonylphenyl phosphite | 1 |
| Calcium behenate | 0.3 |
| SL 2016 | 0.15 |
| Hydrogenated rape-seed oil | 1.2 |
| Glyceryl trimontanate | 0.3 |
| Polyethylene wax | 0.15 |
| Stabilizer | 0.1 |

The sheets were heated at 210° C. in an oven and the following results were obtained:

| Stabilizers | | Time in minutes | | | | | | | | | | |
| --- | --- | --- | --- | --- | --- | --- | --- | --- | --- | --- | --- | --- |
| S 3630 | LCS 28504 | 0 | 3 | 6 | 9 | 12 | 15 | 18 | 21 | 24 | 27 | 30 |
| 0 | 0 | 1 | 1 | 1 | 2 | ≧2 | ≧3 | 4 | 7 | 8.5 | 11 | Burnt |
| 0.1 | 0 | 1 | 1 | 1 | 1 | 2 | ≧2 | ≦3 | ≧5 | 11 | B. | — |
| 0.05 | 0.05 | 1 | 1 | 1 | 1 | ≧1 | ≦2 | ≧2 | 3 | ≧5 | B. | — |
| 0 | 0.1 | 1 | 1 | 1 | ≧1 | ≧2 | 3 | 5 | 11 | B. | — | — |

The above results confirm the potentiation of the stabilizing power of the compounds forming the associations according to the invention.

(4) Associations

S 3621-LCS 28507  S 3621-LCS 28588  S 3621-LCS 28603  S3621-LCS 28512  S 3621-LCS 28541  S 3621-LCS 28597  S 3621-LCS 28601

The following compound was prepared:

| Ingredients | Parts by weight |
| --- | --- |
| Polyvinyl chloride resin | 100 |
| Antishock agent | 9 |
| Epoxide soja bean oil | 2 |
| SL 2016 | 0.1 |
| Calcium hydroxystearate | 0.2 |
| Stabilizer | 0.3 |

The compound was prepared at 160°–162° C. and the sheets were heated at 210° C. in an oven.
The following results were obtained:

| Stabilizers | | | Time in minutes | | | | | | |
| --- | --- | --- | --- | --- | --- | --- | --- | --- | --- |
| S 3621 | LCS 28507 | LCS 28588 | 0 | 3 | 6 | 9 | 12 | 15 | 18 |
| 0.3 | 0 | 0 | 1 | 1 | 2 | 3 | 10 | 11 | 11.5 |
| 0.15 | 0.15 | 0 | 1 | 1 | 2 | 2.5 | 5 | 8 | 10.5 |
| 0.15 | 0 | 0.15 | 1 | 1 | 1 | 1.5 | 4 | 6 | 6 |

| Stabilizers | | | | | | Time in minutes | | | | | | |
| --- | --- | --- | --- | --- | --- | --- | --- | --- | --- | --- | --- | --- |
| S3621 | LCS 28603 | LCS 28512 | LCS 28541 | LCS 28597 | LCS 28601 | 0 | 3 | 6 | 9 | 12 | 15 | 18 | 21 |
| 0.3 | 0 | 0 | 0 | 0 | 0 | 1 | 1 | 1 | 3 | 4 | 11 | 17 | — |
| 0.15 | 0.15 | 0 | 0 | 0 | 0 | 1 | 1 | 1 | 2 | 2.5 | 2.5 | 4 | 7 |
| 0.15 | 0 | 0.15 | 0 | 0 | 0 | 1 | 1 | 1 | 2.5 | 3 | 4 | 6 | 8 |
| 0.15 | 0 | 0 | 0.15 | 0 | 0 | 1 | 1 | 1 | 2.5 | 3 | 6 | 10 | 10 |
| 0.15 | 0 | 0 | 0 | 0.15 | 0 | 1 | 1 | 1 | 2 | 2.5 | 3 | 4 | 7 |
| 0.15 | 0 | 0 | 0 | 0 | 0.15 | 1 | 1 | 1 | 2.5 | 3 | 7 | 9.5 | 11 |

The above results show that the associations of the invention have a thermostabilizing power markedly superior that of S 3621 used alone at an equivalent concentration.

(5) Associations

S 3630-LCS 28603  S 3630-LCS 28512  S 3630-LCS 28541  S 3630-LCS 28597  S 3630-LCS 28601

The same resin as hereabove was employed. The compound was prepared at 162.5° C. and the sheets were heated at 212° C. in an oven.
The following results were obtained:

| Stabilizers | | | | | | Time in minutes | | | | | |
| --- | --- | --- | --- | --- | --- | --- | --- | --- | --- | --- | --- |
| S3630 | LCS 28603 | LCS 28512 | LCS 28541 | LCS 28597 | LCS 28601 | 0 | 3 | 6 | 9 | 12 | 15 | 18 |
| 0.3 | 0 | 0 | 0 | 0 | 0 | 1 | 1 | 2 | 3 | 5 | 11 | 13 |
| 0.15 | 0.15 | 0 | 0 | 0 | 0 | 1 | 1 | 2 | 2.5 | 2.5 | 4 | 8 |
| 0.15 | 0 | 0.15 | 0 | 0 | 0 | 1 | 1 | 2 | 2.5 | 2.5 | 8 | 10.5 |
| 0.15 | 0 | 0 | 0.15 | 0 | 0 | 1 | 1 | 2 | 2.5 | 8 | 10 | 13 |
| 0.15 | 0 | 0 | 0 | 0.15 | 0 | 1 | 1 | 2 | 2.5 | 5 | 8.5 | 13 |
| 0.15 | 0 | 0 | 0 | 0 | 0.15 | 1 | 1 | 2 | 2.5 | 5 | 9.5 | 13 |

The above results show that the associations of the invention have a thermostabilizing power markedly superior to that of S 3630 used alone at an equivalent concentration.

Moreover, the resins stabilized with an association of the invention do not present a pink coloration at time zero, as opposed to the resin stabilized with S 3630.

(6) Associations

LCS 26003-LCS 28507 LCS 26035-LCS 28507 S 3628-LCS 28507

The same resin as hereabove was employed. The compound was prepared at 160°–162° C. and the sheets were heated at 210° C. in an oven.

The following results were obtained:

| Stabilizers | | | | Time in minutes | | | | | | |
|---|---|---|---|---|---|---|---|---|---|---|
| LCS 26003 | LCS 26035 | LCS S3628 | LCS 28507 | 0 | 3 | 6 | 9 | 12 | 15 | 18 |
| 0.3 | 0 | 0 | 0 | 1 | 1 | 1 | 2 | 3 | 10.5 | 14 |
| 0.15 | 0 | 0 | 0.15 | 1 | 1 | 1 | 1.5 | 4 | 10 | 10.5 |
| 0 | 0.3 | 0 | 0 | 1 | 1 | 1 | 2 | 4 | 13 | 14 |
| 0 | 0.15 | 0 | 0.15 | 1 | 1 | 1 | 2 | 4 | 6 | 11 |
| 0 | 0 | 0.3 | 0 | 1 | 1 | 1.5 | 2.5 | 5.5 | 13 | 14 |
| 0 | 0 | 0.15 | 0.15 | 1 | 1 | 1 | 2 | 5 | 10 | 11 |

The hereabove associations were also found to be superior to the indole derivatives used alone at equivalent concentrations.

(7) Association: S 3621-LCS 28507

This study was carried out with different polyvinyl chloride resins but containing the same ingredients as hereabove.

The compound was prepared in a cylindrical mixer at 162° C. in the first case and at 160° C. in the second and the sheets were heated in an oven at 210° C. in the first case and 212° C. in the second.

The following results were obtained:

| Stabilizers | | Time in minutes | | | | | | |
|---|---|---|---|---|---|---|---|---|
| S 3621 | LCS 28507 | 0 | 3 | 6 | 9 | 12 | 15 | 18 |
| 0 | 0.3 | 1 | 1 | 1 | 2 | 3.5 | 10 | 14 |
| 0.05 | 0.25 | 1 | 1 | 1 | 2 | 3 | 6 | 14 |
| 0.10 | 0.20 | 1 | 1 | 1 | 2 | 3 | 7 | 12 |
| 0.20 | 0.10 | 1 | 1 | 1 | 2 | 3 | 6 | 10.5 |
| 0.25 | 0.05 | 1 | 1 | 1 | 2 | 3.5 | 10 | 11.5 |
| 0.3 | 0 | 1 | 1 | 1 | 2 | 4 | 10 | 13 |
| 0 | 0.3 | 1 | 1 | 1 | 2.5 | 4 | 10 | 15 |
| 0.05 | 0.25 | 1 | 1 | 1 | 2 | 3.5 | 7 | 14 |
| 0.10 | 0.20 | 1 | 1 | 1 | 2 | 3 | 6 | 11 |
| 0.20 | 0.10 | 1 | 1 | 1 | 2 | 3 | 5.5 | 10.5 |
| 0.25 | 0.05 | 1 | 1 | 1 | 2.5 | 3.5 | 10 | 12 |
| 0.3 | 0 | 1 | 1 | 1 | 2 | 4 | 10 | 12.5 |

The above results confirm the potentiating effect obtained by associating S 3621 and LCS 28507.

(b) Stabilization of Vinyl Co-polymers

I. Co-polymer Polyvinylchloride-vinylidene Chloride

The following compound was prepared at 160°–162° C.

| Ingredients | Parts by weight |
|---|---|
| Polyvinyl chloride resin | 90 |
| Co-polymer vinylchloride-vinylidene chloride | 10 |
| Antishock agent | 8 |
| Epoxide soja bean oil | 4 |
| Calcium stearate | 0.2 |
| Zinc stearate | 0.1 |
| Hydrogenated rape-seed oil | 1.2 |
| Glyceryl trimontanate | 0.4 |
| Stabilizer | 0.3 |

The following results were obtained, the sheets have been heated at 210° C./212° C. in a ventilated oven:

(1) Associations

S 3621-LCS 28504 S 3621-LCS 28507

| Stabilizers | | | Time in minutes | | | | | |
|---|---|---|---|---|---|---|---|---|
| S3621 | LCS28504 | LCS28507 | 0 | 3 | 6 | 9 | 12 | 15 |
| 0.3 | 0 | 0 | 1 | 1 | 1.5 | 5 | 14 | 16 |
| 0.2 | 0.1 | 0 | 1 | 1 | 1 | 2 | 9 | 16 |
| 0.15 | 0.15 | 0 | 1 | 1 | 1 | 2 | 8.5 | 16 |
| 0.1 | 0.2 | 0 | 1 | 1 | 1 | 2 | 6 | 10 |
| 0.1 | 0 | 0.2 | 1 | 1 | 1 | 4 | 12 | 15 |
| 0.15 | 0 | 0.15 | 1 | 1 | 1 | 3 | 12 | 15 |

Besides showing the compatibility of L 28504 and L 28507 with S 3621 in a co-polymer vinyl chloride-vinylidene chloride, the above results also demonstrate the superiority of the above associations over S 3621 used alone at an equivalent concentration.

(2) Associations

S 3621-L 28511 S 3621-L 28512 S 3621-L 28513 S 3621-L 28541 S 3621-L 28588

| Stabilizers | | | | | | Time in minutes | | | | |
|---|---|---|---|---|---|---|---|---|---|---|
| S3621 | LCS 28511 | LCS 28512 | LCS 28513 | LCS 28541 | LCS 28588 | 0 | 3 | 6 | 9 | 12 | 15 |
| 0.3 | 0 | 0 | 0 | 0 | 0 | 1 | 2 | 2.5 | 4 | 12 | 16 |
| 0.15 | 0.15 | 0 | 0 | 0 | 0 | 1 | 2 | 2 | 4 | 9 | 13 |
| 0.15 | 0 | 0.15 | 0 | 0 | 0 | 1 | 2 | 2 | 3 | 8 | 12 |
| 0.15 | 0 | 0 | 0.15 | 0 | 0 | 1 | 2 | 2 | 3 | 8 | 14 |
| 0.15 | 0 | 0 | 0 | 0.15 | 0 | 1 | 2 | 3 | 3.5 | 8.5 | 11 |
| 0.15 | 0 | 0 | 0 | 0 | 0.15 | 1 | 2 | 3 | 3.5 | 8.5 | 14 |

The above associations are also superior to S 3621 used alone at an equivalent concentration. Moreover, the resins stabilized with the hereabove associations do not present a pink coloration at time zero, as opposed to the resin stabilized with S 3621.

(3) Associations

S 3621-LCS 28597 S 3621-LCS 28601 S 3621-LCS 28603

| Stabilizers | | | | Time in minutes | | | | |
|---|---|---|---|---|---|---|---|---|
| S3621 | LCS28597 | LCS28601 | LCS 28603 | 0 | 3 | 6 | 9 | 12 | 15 |
| 0.3 | 0 | 0 | 0 | 1 | 2 | 2.5 | 4 | 10 | 13 |

-continued

| Stabilizers | | | | Time in minutes | | | | | |
|---|---|---|---|---|---|---|---|---|---|
| S3621 | LCS28597 | LCS28601 | LCS 28603 | 0 | 3 | 6 | 9 | 12 | 15 |
| 0.15 | 0.15 | 0 | 0 | 1 | 2 | 2 | 3 | 7 | 9 |
| 0.15 | 0 | 0.15 | 0 | 1 | 2 | 2 | 3 | 8 | 11 |
| 0.15 | 0 | 0 | 0.15 | 1 | 2 | 3 | 7 | 8 | — |

The same conclusion as hereabove may be drawn.

(4) Association

L 26035-L 28507

| Stabilizers | | Time in minutes | | | | | |
|---|---|---|---|---|---|---|---|
| LCS 26035 | LCS 28507 | 0 | 3 | 6 | 9 | 12 | 15 |
| 0.3 | 0 | 1 | 2.5 | 5 | 10.5 | 13 | 16 |
| 0.15 | 0.15 | 1 | 2 | 3 | 8 | 9 | 13 |

The same conclusion as hereabove may also be drawn.

II. Co-polymer vinylchloride-vinyl acetate

The following compound was prepared at 140° C.:

| Ingredients | Parts by weight |
|---|---|
| Co-polymer vinylchloride-vinyl acetate | 80 |
| Polyvinyl chloride resin | 20 |
| Calcium stearate | 0.5 |
| Stabilizer | 0.20 or 0.25 |

The sheets were heated at 185° C. in a ventilated oven and the following results were obtained:

(1) Associations

S 3621-LCS 28504  S 3621-LCS 28507

| Stabilizers | | | Time in minutes | | | | | | |
|---|---|---|---|---|---|---|---|---|---|
| S3621 | LCS28504 | LCS28507 | 0 | 2 | 4 | 6 | 8 | 10 | 12 |
| 0.25 | 0 | 0 | 1 | 1 | 2 | 3 | 10 | 13 | 18.5 |
| 0.10 | 0.10 | 0 | 1 | 1 | 1.5 | 3 | 8 | 12 | 18 |
| 0.10 | 0.15 | 0 | 1 | 1 | 1.5 | 2.5 | 6 | 11 | 14 |
| 0.15 | 0.10 | 0 | 1 | 1 | 1.5 | 2.5 | 5.5 | 11 | 12 |
| 0.15 | 0 | 0.10 | 1 | 1 | 2 | 3 | 10 | 12 | 17.5 |

-continued

| Stabilizers | | | Time in minutes | | | | | | |
|---|---|---|---|---|---|---|---|---|---|
| S3621 | LCS28504 | LCS28507 | 0 | 2 | 4 | 6 | 8 | 10 | 12 |
| 0.10 | 0 | 0.15 | 1 | 1 | 2 | 2.5 | 10 | 12 | 17.5 |

It may be concluded that the associations of the invention have a stabilizing power superior to that of S 3621 used alone at an equivalent concentration.

(2) Associations

S 3621-LCS 28511  S 3621 -LCS 28512  S 3621- LCS 28513  S 3621-LCS 28541  S 3621 -LCS 28588

| Stabilizers | | | | | | Time in minutes | | | | | | |
|---|---|---|---|---|---|---|---|---|---|---|---|---|
| S3621 | LCS 28511 | LCS 28512 | LCS 28513 | LCS 28541 | LCS 28588 | 0 | 2 | 4 | 6 | 8 | 10 | 12 | 14 |
| 0.25 | 0 | 0 | 0 | 0 | 0 | 1 | 1 | 1 | 2 | 12 | 14 | 18.5 | — |
| 0.10 | 0.15 | 0 | 0 | 0 | 0 | 1 | 1 | 1 | 4 | 10 | 13 | 16 | — |
| 0.10 | 0 | 0.15 | 0 | 0 | 0 | 1 | 1 | 1 | 2 | 8 | 12 | 14 | 18 |
| 0.10 | 0 | 0 | 0.15 | 0 | 0 | 1 | 1 | 1 | 3 | 6 | 11.5 | 17 | — |
| 0.10 | 0 | 0 | 0 | 0.15 | 0 | 1 | 1 | 1 | 1 | 10 | 12 | 17 | 18 |
| 0.10 | 0 | 0 | 0 | 0 | 0.15 | 1 | 1 | 1 | 4 | 10 | 12.5 | 16 | — |

These results also show that the above associations are superior to S 3621 used alone at an equivalent concentration.

(3) Associations

S 3621-LCS 28597  S 3621 -LCS 28601  S 3621-LCS 28603

(For Tests 3 and 4 the compound was prepared at 135° C.)

| Stabilizers | | | | Time in minutes | | | | | |
|---|---|---|---|---|---|---|---|---|---|
| S3621 | LCS 28597 | LCS 28601 | LCS 28603 | 0 | 2 | 4 | 6 | 8 | 10 | 12 |
| 0.25 | 0 | 0 | 0 | 1 | 1 | 2 | 3.5 | 11.5 | 12.5 | 15 |
| 0.10 | 0.15 | 0 | 0 | 1 | 1 | 2 | 3 | 10 | 12.5 | 14 |
| 0.10 | 0 | 0.15 | 0 | 1 | 1 | 2 | 3 | 10 | 12 | 14 |
| 0.10 | 0 | 0 | 0.15 | 1 | 1 | 2 | 3 | 10 | 11 | 14 |

The same conclusion as hereabove may be drawn.

(4) Association

LCS 26035-LCS 28507

| Stabilizers | | Time in minutes | | | | | |
|---|---|---|---|---|---|---|---|
| LCS 26035 | LCS 28507 | 0 | 2 | 4 | 6 | 8 | 10 | 12 |
| 0.25 | 0 | 1 | 1 | 2 | 3.5 | 11 | 13 | 15 |
| 0.10 | 0.15 | 1 | 1 | 2 | 3 | 10 | 12 | 14 |

The same conclusion as hereabove may be drawn.

(5) Association

S 3621-L 28504

For this trial, the following compound was prepared at 137.5° C. and the sheets were heated at 185° C. in a ventilated oven:

| Ingredients | Parts by weight |
|---|---|
| Co-polymer vinylchloride-vinyl acetate | 100 |
| Calcium stearate | 0.5 |
| Glyceryl tribehenate | 0.4 |

-continued

| Ingredients | Parts by weight |
|---|---|
| Stabilizer | 0.25 |

The following results were obtained:

| Stabilizers | | Time in minutes | | | |
|---|---|---|---|---|---|
| S 3621 | LCS 28504 | 0 | 3 | 6 | 9 |
| 0.25 | 0 | 1 | 3 | 15 | — |
| 0.15 | 0.10 | 1 | 2 | 5 | 18 |

These results confirm the superiority of the above association over S 3621 used alone at an equivalent concentration.

C. Results of the Photostability Study

The photostabilizing power of the associations of the invention was determined by exposing to the sun plates of vinyl resin and by evaluating their coloration after fixed intervals of time (1) Polyvinyl chloride resins (a) Associations S 3630-LCS 28504  S 3621-LCS 28504
The following compound was prepared at 160° C.

| Ingredients | Parts by weight |
|---|---|
| Polyvinyl chloride resin | 100 |
| Antishock agent | 8 |
| Epoxide soja bean oil | 4 |
| Acrylic resin | 0.5 |
| Trinonylphenyl phosphite | 0.3 |
| SL 2016 | 0.25 |
| Calcium behenate | 0.4 |
| Hydrogenated rape-seed oil | 0.2 |
| Glyceryl trimontanate | 0.4 |
| Stabilizer of formula I | 0 to 0.3 |
| Stabilizer of formula II | 0 to 0.5 |

The coloration of the plates was determined according to two methods:
On the plates themselves by comparison with the GARDNER scale.
On solutions of the plates in tetrahydrofuran by comparison with the scale of colorations described in "La Pharmacopee Francaise" (9th Edition, II, 338).

The following results were obtained:

| Stabilizers | | | GARDNER SCALE Time in hours | | | FRENCH PHARMACOPEIA Time in hours | | |
|---|---|---|---|---|---|---|---|---|
| S3630 | S3621 | LCS28504 | 0 | 6 | 12 | 0 | 6 | 12 |
| 0.3 | 0 | 0 | 1 | 5 | — | B4 | JB3 | — |
| 0.3 | 0 | 0.1 | 1 | 4 | — | B4 | B3 | — |
| 0.3 | 0 | 0.25 | 1 | 3.5 | — | B4 | JB3 | — |
| 0.3 | 0 | 0.5 | 1 | 3 | — | JB4 | JV3 | — |
| 0 | 0.3 | 0 | 1 | 4 | — | JV6 | JB5 to JB4 | — |
| 0 | 0.3 | 0.1 | 1 | 3 | — | JV6 | J5 | — |
| 0 | 0.3 | 0.25 | 1 | 2 | — | JV6 | J5 | — |
| 0 | 0.3 | 0.5 | 1 | 1.5 | — | JV6 | J5 | — |
| 0.3 | 0 | 0 | 1 | 10 | 12 | B6 | JB3 to JB4 | JB3 |
| 0.25 | 0 | 0.05 | 1 | 9 | 10 | B6 | JB4 | JB3 |
| 0.2 | 0 | 0.1 | 1 | 8 | 9 | B6 | JB3 | JB3 |
| 0.15 | 0 | 0.15 | 1 | 7 | 8 | B5 | B4 | JB3 |

| Stabilizers | | | GARDNER SCALE Time in hours | | | FRENCH PHARMACOPEIA Time in hours | | |
|---|---|---|---|---|---|---|---|---|
| S3630 | S3621 | LCS28504 | 0 | 6 | 12 | 0 | 6 | 12 |
| 0.1 | 0 | 0.2 | 1 | 5 | 6 | B6 | JB4 | JB4 to JB3 |
| 0 | 0 | 0.3 | 1 | 1.5 | 1.5 | JV6 | JV6 | JV6 |
| 0 | 0.3 | 0 | 1 | 4 | 6 | JV6 | JB4 | J3 to J4 |
| 0 | 0.25 | 0.05 | 1 | 3 | 5 | JV6 | J4 | J3 |
| 0 | 0.2 | 0.1 | 1 | 3 | 4 | JV6 | J4 | J3 to J4 |
| 0 | 0.15 | 0.15 | 1 | 3 | 3 | JV6 | J4 | J4 |
| 0 | 0.1 | 0.2 | 1 | 3 | 3 | JV6 | J4 | JB4 |
| 0 | 0 | 0.3 | 1 | 1 | 1 | JV6 | JV6 | JV6 |

These results clearly show that the above associations have a photostabilizing power which is markedly superior to that of S 3630 and S 3621 used alone at an equivalent concentration.

(b) Associations

S 3621-LCS 28603  S 3621-LCS 28512  S 3621-LCS 28541  S 3621-LCS 28597  S 3621-LCS 28601
The following compound was prepared at 160° C.:

| Ingredients | Parts by weight |
|---|---|
| Polyvinyl chloride resin | 100 |
| Antishock agent | 9 |
| Epoxide soja bean oil | 2 |
| SL 2016 | 0.1 |
| Calcium hydroxystearate | 0.2 |
| Stabilizer | 0.3 |

The following results were obtained:

| Stabilizers | | | | | | GARDNER SCALE Time in hours | | |
|---|---|---|---|---|---|---|---|---|
| S 3621 | LCS 28603 | LCS 28512 | LCS 28541 | LCS 28597 | LCS 28601 | 0 | 24 | 48 |
| 0.3 | 0 | 0 | 0 | 0 | 0 | 1 | 10 | 11 |
| 0.15 | 0.15 | 0 | 0 | 0 | 0 | 1 | 8 | 10 |
| 0.15 | 0 | 0.15 | 0 | 0 | 0 | 1 | 7 | 10 |
| 0.15 | 0 | 0 | 0.15 | 0 | 0 | 1 | 4 | 10 |
| 0.15 | 0 | 0 | 0 | 0.15 | 0 | 1 | 7 | 9 |
| 0.15 | 0 | 0 | 0 | 0 | 0.15 | 1 | 8 | 10 |

It may be concluded that the associations of the invention have a photostabilizing effect on polyvinyl chloride which is markedly superior to that of S 3621 used alone at an equivalent concentration.

It should be emphasized that the conditions of exposure to sunlight were particularly severe and that the duration of photostabilization by the associations of the invention is from 20 to 60% superior to that obtained with S 3621.

Moreover, it should be noted that the GARDNER scale does not always allow a strict comparison of the real colours to be made, mainly because of the pink tints which appear in the resins. The visual aspect of the plates showed an even more marked superiority in favour of the associations of the invention.

(c) Associations

S 3630-LCS 28603  S 3630-LCS 28512  S 3630-LCS 28541  S 3630-LCS 28597  S 3630-LCS 28601

The same resin as hereabove was prepared and the following results were obtained:

| Stabilizers | | | | | | GARDNER SCALE Time in hours | | |
|---|---|---|---|---|---|---|---|---|
| S 3630 | LCS 28603 | LCS 28512 | LCS 28541 | LCS 28597 | LCS 28601 | 0 | 24 | 48 |
| 0.3 | 0 | 0 | 0 | 0 | 0 | 1 | 12 | 14 |
| 0.15 | 0.15 | 0 | 0 | 0 | 0 | 1 | 11 | 12 |
| 0.15 | 0 | 0.15 | 0 | 0 | 0 | 1 | 10 | 11 |
| 0.15 | 0 | 0 | 0.15 | 0 | 0 | 1 | 11 | 12 |
| 0.15 | 0 | 0 | 0 | 0.15 | 0 | 1 | 11 | 13 |
| 0.15 | 0 | 0 | 0 | 0 | 0.15 | 1 | 11 | 12 |

The same conclusions as hereabove may be drawn.

(d) Associations

LCS 26003-LCS 28507  LCS 26035-LCS 28507  S 3628-LCS 28507

The same resin as hereabove was prepared at 162° C. and the following results were obtained.

| Stabilizers | | | | GARDNER SCALE Time in hours | | |
|---|---|---|---|---|---|---|
| LCS26003 | LCS26035 | S3628 | LCS28507 | 0 | 24 | 48 |
| 0.3 | 0 | 0 | 0 | 1 | 12 | 14 |
| 0.15 | 0 | 0 | 0.15 | 1 | 10.5 | 12 |
| 0 | 0.3 | 0 | 0 | 1 | 12 | 14 |
| 0 | 0.15 | 0 | 0.15 | 1 | 10.5 | 13 |
| 0 | 0 | 0.3 | 0 | 1 | 10 | 12 |
| 0 | 0 | 0.15 | 0.15 | 1 | 9.5 | 10.5 |

The associations of the invention are markedly superior to the 2-phenyl indole derivatives used alone at an equivalent concentration.

(e) Association

S 3621-LCS 28507

The same resin as hereabove was prepared and the following results were obtained:

| Stabilizers | | GARDNER SCALE Time in hours | |
|---|---|---|---|
| S 3621 | LCS 28507 | 0 | 24 |
| 0 | 0.3 | 1 | 1 |
| 0.05 | 0.25 | 1 | 4 |
| 0.1 | 0.2 | 1 | 5 |
| 0.2 | 0.1 | 1 | 7.5 |
| 0.25 | 0.05 | 1 | 8 |
| 0.3 | 0 | 1 | 10 |

The above results show that the thermostabilization of the resin improves as the amount of LCS 28507 in the association increases.

This means that the compounds of formula II have properties which are complementary to those of the compounds of formula I, i.e. that the associations of the invention present the advantages of the compounds of formula I together with the advantages of the compounds of formula II.

(2) Vinyl co-polymers (a) Co-polymer vinyl chloride-vinylidene chloride

The following compound was prepared at 162.5° C.

| Ingredients | Parts by weight |
|---|---|
| Polyvinyl chloride resin | 90 |
| Co-polymer vinylchloride-vinylidene chloride | 10 |
| Antishock agent | 8 |
| Epoxide soja bean oil | 4 |
| Calcium stearate | 0.2 |
| Zinc stearate | 0.1 |
| Hydrogenated rape-seed oil | 1.2 |
| Glyceryl trimontanate | 0.4 |
| Stabilizer | 0.3 |

(α) Associations

S 3621-LCS 28504  S 3621-LCS 28507

The following results were obtained:

| Stabilizers | | | GARDNER SCALE Time in hours | |
|---|---|---|---|---|
| S 3621 | LCS 28504 | LCS 28507 | 0 | 48 |
| 0.3 | 0 | 0 | 1 | 15 |
| 0.2 | 0.1 | 0 | 1 | 11.5 |
| 0.15 | 0.15 | 0 | 1 | 11 |
| 0.1 | 0.2 | 0 | 1 | 11 |
| 0.15 | 0 | 0.15 | 1 | 11.5 |
| 0.1 | 0 | 0.2 | 1 | 11 |

The above results show a marked improvement in the photostabilization obtained by the association of the invention compared with that obtained by S 3621 used alone at an equivalent concentration. It appears that the maximum stabilization is obtained at 0.15 p.h.p.r. of LCS 28504 or LCS 28507 and that higher concentrations of these constituents do not lead to a greater degree of photostabilization of the resin.

(β) Associations

S 3621-LCS 28511  S 3621-LCS 28513  S 3621-LCS 28512  S 3621-LCS 28541  S 3621-LCS 28588

The following results were obtained:

| Stabilizers | | | | | | GARDNER SCALE Time in hours | | |
|---|---|---|---|---|---|---|---|---|
| S 3621 | LCS 28511 | LCS 28513 | LCS 28512 | LCS 28541 | LCS 28588 | 0 | 24 | 48 |
| 0.3 | 0 | 0 | 0 | 0 | 0 | 1 | 8 | 14 |
| 0.15 | 0.15 | 0 | 0 | 0 | 0 | 1 | 4 | 10 |
| 0.15 | 0 | 0.15 | 0 | 0 | 0 | 1 | 4 | 10 |
| 0.15 | 0 | 0 | 0.15 | 0 | 0 | 1 | 4 | 10 |
| 0.15 | 0 | 0 | 0 | 0.15 | 0 | 1 | 4.5 | 11 |
| 0.15 | 0 | 0 | 0 | 0 | 0.15 | 1 | 4 | 10 |

These results show that the above associations are markedly superior to S 3621 used alone at an equivalent concentration.

(γ) Associations

S 3621-LCS 28597  S 3621-LCS 28601  S 3621-LCS 28603

The following results were obtained:

| Stabilizers | | | | GARDNER SCALE Time in hours | | |
|---|---|---|---|---|---|---|
| S 3621 | LCS 28597 | LCS 28601 | LCS 28603 | 0 | 24 | 48 |
| 0.3 | 0 | 0 | 0 | 1 | 8 | 14 |

-continued

| Stabilizers | | | | GARDNER SCALE Time in hours | | |
|---|---|---|---|---|---|---|
| S 3621 | LCS 28597 | LCS 28601 | LCS 28603 | 0 | 24 | 48 |
| 0.15 | 0.15 | 0 | 0 | 1 | 4 | 11 |
| 0.15 | 0 | 0.15 | 0 | 1 | 4 | 11 |
| 0.15 | 0 | 0 | 0.15 | 1 | 4 | 12 |

The same conclusions as hereabove may be drawn.

(δ) Associations

LCS 26035-LCS 28507
The following results were obtained:

| Stabilizers | | GARDNER SCALE Time in hours | | |
|---|---|---|---|---|
| LCS 26035 | LCS 28507 | 0 | 24 | 48 |
| 0.3 | 0 | 1 | 8 | 14 |
| 0.15 | 0.15 | 1 | 4 | 4 |

The same conclusions as hereabove may be drawn.

D. Study of the Extractibility of the Association of the Invention

The extractibility by water of the association of the invention was studied using two types of resin containing as stabilizer the association: S 3630-LCS 28504.

These two types of resin were:
(1) A normal compound for mineral-water bottles, containing organic salts of calcium and zinc, epoxide soja bean oil and the abovementioned association.
(2) A compound similar to the above but containing different percentages in salts and more particularly a markedly higher concentration in zinc salt.

Bottles manufactured with the above compounds were filled with water and kept in an oven at 45° C. for one month.

The quantity of 2-(3'-methoxy-4'-hydroxy-phenyl)-indole (S 3630) extracted by the water was determined by colorimetric analysis with p-dimethylaminobenzaldehyde, according to the method described in Analytical Chemistry 36, 425-26 (1964).

The quantity of 2,6-dimethyl-3,5-dicarbomethoxy-1,4-dihydropyridine (LCS 28504) extracted by the water was determined by analysing this substance under the form of its oxydation product: 2,6-dimethyl-3,5-dicarbomethoxy-pyridine, according to the method described in the French patent application No. 77 30991.

The results obtained showed that the extractability of each constituent of the association is very slight, being lower than 5 μg/liter.

This means that the associations of the invention can be used for stabilizing resins which are intended for manufacturing containers for food and drink.

We claim:

1. New association for stabilizing vinyl resins comprising a compound of the general formula:

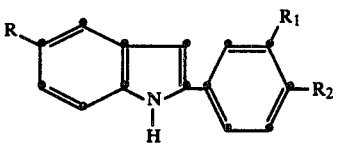

wherein $R_1$ and $R_2$, which are the same or different, each represent a hydrogen atom, a branched- or straight-chain alkyl or alkoxy radical containing from 1 to 12 carbon atoms or a hydroxy radical, R represents a hydrogen atom or a branched- or straight-chain alkyl or alkoxy radical containing from 1 to 4 carbon atoms, and a compound of the general formula:

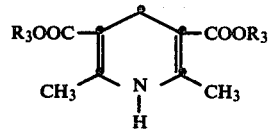

wherein $R_3$ represents a branched- or straight-chain alkyl radical containing from 1 to 22 carbon atoms, a branched- or straight-chain alkenyl or alkynyl radical containing from 3 to 11 carbon atoms, an aralkyl radical optionally substituted on the para- or ortho-position by a halogen atom or by a methyl or methoxy radical, a radical $R_4$—$O(CH_2)_n$—wherein n is 2, 3 or 4 and $R_4$ represents a branched- or straight-chain alkyl radical containing from 1 to 4 carbon atoms or a phenyl radical.

2. New association for stabilizing vinyl resins comprising 2-phenyl-indole and 2,6-dimethyl-3,5-dicarbomethoxy-1,4-dihydropyridine.

3. New association for stabilizing vinyl resins comprising 2-(3'-methoxy-4'-hydroxy-phenyl)-indole and 2,6-dimethyl-3,5-dicarbomethoxy-1,4-dihydropyridine.

4. New association for stabilizing vinyl resins comprising 2-(3'-methoxy-4'-hydroxy-phenyl)-indole and 2,6-dimethyl-3,5-dicarbododecyloxy-1,4-dihydropyridine.

5. New association according to claim 1 wherein the ratio by weight between the compound of formula I and that of formula II lies between 0.05 and 20.

6. New association according to claim 1 wherein the ratio by weight between the compound of formula I and that of formula II lies between 0.1 and 1.

7. Process for stabilizing a polyvinyl chloride resin whereby an association according to claim 1 is introduced into the resin in a quantity of 0.02 to 0.3 part per hundred parts of resin.

8. Process for stabilizing a vinyl chloride co-polymer whereby an association according to claim 1 is introduced into the co-polymer in a quantity of 0.02 to 1 part per hundred parts of the resin.

9. Polyvinyl chloride resin containing as stabilizer an association according to claim 1.

10. Vinyl chloride co-polymer containing as stabilizer an association according to claim 1.

11. Vinyl chloride-vinyl acetate co-polymer containing as stabilizer an association according to claim 1.

12. Vinyl chloride-vinylidene chloride co-polymer containing as stabilizer an association according to claim 1.

* * * * *